United States Patent
Yoshiura

(10) Patent No.: US 11,265,412 B2
(45) Date of Patent: Mar. 1, 2022

(54) COOPERATION SYSTEM, COOPERATION METHOD, AND COMPUTER PROGRAM PRODUCT

(71) Applicant: CLARION CO., LTD., Saitama (JP)

(72) Inventor: Maiko Yoshiura, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 17/045,446

(22) PCT Filed: Feb. 22, 2019

(86) PCT No.: PCT/JP2019/006897
§ 371 (c)(1),
(2) Date: Oct. 5, 2020

(87) PCT Pub. No.: WO2019/193863
PCT Pub. Date: Oct. 10, 2019

(65) Prior Publication Data
US 2021/0029236 A1    Jan. 28, 2021

(30) Foreign Application Priority Data
Apr. 5, 2018   (JP) .............................. JP2018-073191

(51) Int. Cl.
H04M 1/60          (2006.01)
H04M 1/72412       (2021.01)
H04M 1/72415       (2021.01)

(52) U.S. Cl.
CPC ..... *H04M 1/6083* (2013.01); *H04M 1/72412* (2021.01); *H04M 1/72415* (2021.01)

(58) Field of Classification Search
CPC ........... H04M 1/6083; H04M 1/72412; H04M 1/72415; H04M 1/6091
See application file for complete search history.

(56) References Cited

U.S. PATENT DOCUMENTS 9,967,687 B2    5/2018  Kobayashi
2007/0140187 A1*  6/2007  Rokusek ................. H04L 67/12
                                                370/338
(Continued)

FOREIGN PATENT DOCUMENTS

CN    107148649 A     9/2017
JP    2010-28479 A    2/2010
(Continued)

OTHER PUBLICATIONS

Chinese Office Action dated Feb. 25, 2021 regarding Chinese Patent Application No. 201980024123.X corresponding to U.S. Appl. No. 17/045,446 (11 pages) with English Translation (17 pages).
(Continued)

*Primary Examiner* — Farid Seyedvosoghi
(74) *Attorney, Agent, or Firm* — Lewis Roca Rothgerber Christie LLP

(57) ABSTRACT

A cooperation system is a cooperation system including a mobile terminal and an in-vehicle apparatus that can be coupled according to a plurality of cooperation schemes by using one or more physical couplings, wherein the mobile terminal includes: an app that outputs at least one of an audio signal and an image signal as output data; a cooperation control section that determines the cooperation scheme to be used for transmission of the output data, based on the cooperation scheme that is operatively functioning; and a library that transmits the output data to the in-vehicle apparatus by using the cooperation scheme determined by the cooperation control section, and the in-vehicle apparatus includes: a protocol control section that receives the output data from the library by using the cooperation scheme; and an output section that reproduces the output data received by the protocol control section.

17 Claims, 13 Drawing Sheets

(56) References Cited

U.S. PATENT DOCUMENTS

| | | | |
|---|---|---|---|
| 2014/0115202 A1* | 4/2014 | Yoshinaga | G06F 13/426 710/62 |
| 2017/0280261 A1* | 9/2017 | Kobayashi | G06F 13/00 |
| 2019/0068718 A1* | 2/2019 | Lee | H04L 67/12 |

FOREIGN PATENT DOCUMENTS

| | | |
|---|---|---|
| JP | 2010-130669 A | 6/2010 |
| JP | 2016-90824 A | 5/2016 |

OTHER PUBLICATIONS

International Search Report corresponding to PCT/JP2019/006897, dated Apr. 16, 2019, with English translation, 7 pages.

* cited by examiner

FIG. 4

| PRIORITY INFORMATION | | | |
|---|---|---|---|
| | IMAGE | AUDIO | NOTIFIC-ATION |
| COOPERATION SCHEME A – FIRST COUPLING | F | 3 | 0 |
| COOPERATION SCHEME B – FIRST COUPLING | F | 2 | 2 |
| COOPERATION SCHEME A – SECOND COUPLING | 0 | 1 | 1 |
| COOPERATION SCHEME B – THIRD COUPLING | 1 | 0 | 3 |

111

(a)

| SUMMARIZED INFORMATION | |
|---|---|
| FUNCTION | ALLOCATION DESTINATION |
| IMAGE | COOPERATION SCHEME A – FIRST COUPLING, COOPERATION SCHEME B – FIRST COUPLING |
| AUDIO | COOPERATION SCHEME B – THIRD COUPLING |
| NOTIFICATION | COOPERATION SCHEME A – FIRST COUPLING |

112

(b)

FIG. 8
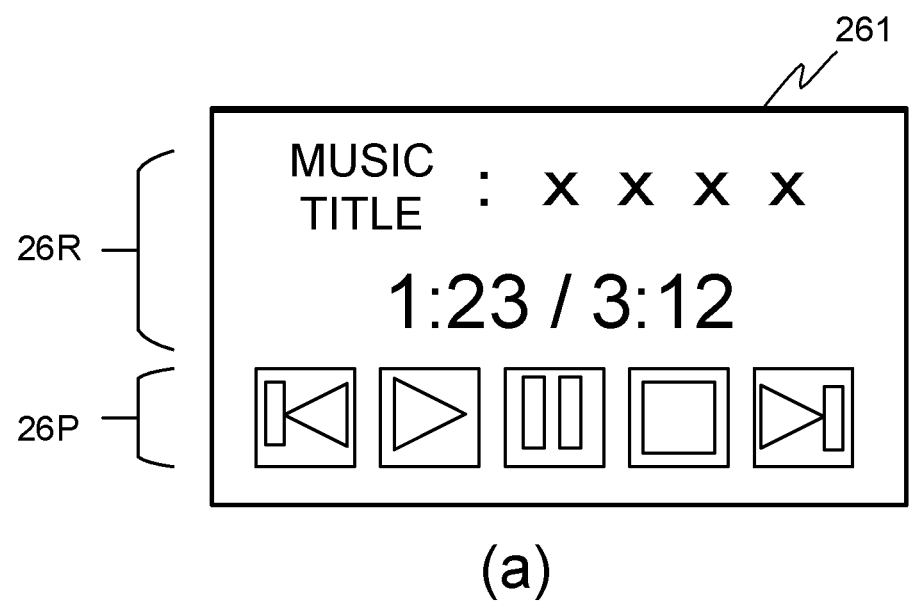
(a)
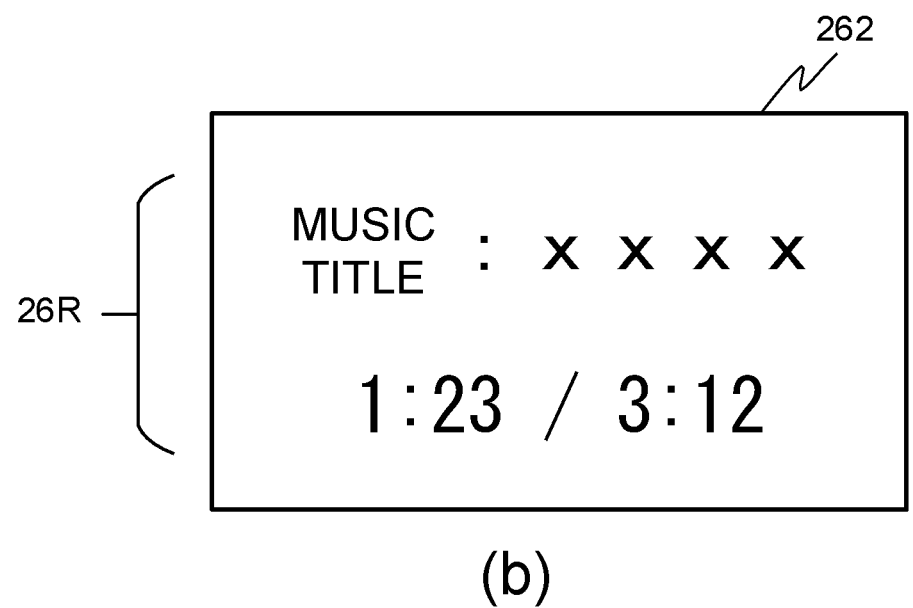
(b)

| PRIORITY INFORMATION | | | | |
|---|---|---|---|---|
| | IMAGE | IMAGE WITH UI | AUDIO | NOTIFIC-ATION |
| COOPERATION SCHEME A – FIRST COUPLING | F | 0 | 3 | 0 |
| COOPERATION SCHEME B – FIRST COUPLING | F | 1 | 2 | 2 |
| COOPERATION SCHEME A – SECOND COUPLING | 0 | 2 | 1 | 1 |
| COOPERATION SCHEME B – THIRD COUPLING | 1 | 3 | 0 | 3 |

(b)

| SUMMARIZED INFORMATION | |
|---|---|
| FUNCTION | ALLOCATION DESTINATION |
| IMAGE | COOPERATION SCHEME A – FIRST COUPLING, COOPERATION SCHEME B –FIRST COUPLING |
| IMAGE WITH UI | COOPERATION SCHEME A – FIRST COUPLING |
| AUDIO | COOPERATION SCHEME B – THIRD COUPLING |
| NOTIFICATION | COOPERATION SCHEME A – FIRST COUPLING |

COOPERATION SYSTEM, COOPERATION METHOD, AND COMPUTER PROGRAM PRODUCT

CROSS-REFERENCE TO RELATED APPLICATION(S)

This application is a U.S. National Phase Patent Application and claims priority to and the benefit of International Application Number PCT/JP2019/006897, filed on Feb. 22, 2019, which claims priority of Japanese Patent Application Number 2018-073191, filed on Apr. 5, 2018, the entire contents of all of which are incorporated herein by reference.

TECHNICAL FIELD

The present invention relates to a cooperation system, a cooperation method, and a computer program product.

BACKGROUND ART

As mobile terminals become more sophisticated, there is a greater need for using a mobile terminal coupled to an in-vehicle apparatus. Patent Literature 1 discloses an in-vehicle device that has a display unit and performs wireless communication with a portable terminal device, the in-vehicle device including: a wireless-communication establishing unit that, upon detection of a portable terminal device positioned at a predetermined distance allowing wireless communication with the in-vehicle device, establishes the wireless communication with the detected portable terminal device; a data acquiring unit that acquires data provided by the portable terminal device, from the portable terminal device with which the wireless communication has been established by the wireless-communication establishing unit; and an output controller that converts data acquired by the data acquiring unit into a format for outputting the data by the in-vehicle device, and outputs converted data to at least one of the display unit and a speaker.

CITATION LIST

Patent Literature

Patent Literature 1: Japanese Patent Laid-Open No. 2010-130669

SUMMARY OF INVENTION

Technical Problem

According to the invention described in Patent Literature 1, a user may be confused when a plurality of cooperation schemes are available.

Solution to Problem

A cooperation system according to a first aspect of the present invention is a cooperation system including a mobile terminal and an in-vehicle apparatus that can be coupled according to a plurality of cooperation schemes by using one or more physical couplings, wherein the mobile terminal includes: an app that outputs at least one of an audio signal and an image signal as output data; a cooperation control section that determines the cooperation scheme to be used for transmission of the output data, based on the cooperation scheme that is operatively functioning; and a library that transmits the output data to the in-vehicle apparatus by using the cooperation scheme determined by the cooperation control section, and the in-vehicle apparatus includes: a protocol control section that receives the output data from the library by using the cooperation scheme; and an output section that reproduces the output data received by the protocol control section.

A cooperation method according to a second aspect of the present invention is a cooperation method between a mobile terminal and an in-vehicle apparatus that can be coupled according to a plurality of cooperation schemes by using one or more physical couplings, the cooperation method including: by the mobile terminal, setting at least one of an audio signal and an image signal as output data; determining the cooperation scheme to be used for transmission of the output data, based on the cooperation scheme that is operatively functioning; transmitting the output data to the in-vehicle apparatus by using the determined cooperation scheme; by the in-vehicle apparatus, receiving the output data from the mobile terminal according to the cooperation scheme; and reproducing the received output data.

A computer program product according to a third aspect of the present invention records a cooperation program to be executed by a mobile terminal that can be coupled to an in-vehicle apparatus according to a plurality of cooperation schemes by using one or more physical couplings, wherein the cooperation program causes the mobile terminal to: set at least one of an audio signal and an image signal as output data; determine the cooperation scheme to be used for transmission of the output data, based on the cooperation scheme that is operatively functioning; and transmit the output data to the in-vehicle apparatus according to the determined cooperation scheme.

Advantageous Effect of Invention

According to the present invention, a user is not confused even when a plurality of cooperation schemes are available.

BRIEF DESCRIPTION OF DRAWINGS

FIG. 4(a) shows an example of priority information 111 in the first embodiment,
and FIG. 4(b) shows an example of summarized information 112 in the first embodiment.
FIG. 8(a) shows a screen with UI 261,
and FIG. 8(b) shows a screen without UI 262.
FIG. 10(a) shows an example of priority information 111A in the second embodiment,
and FIG. 10(b) shows an example of summarized information 112A in the second embodiment.

DESCRIPTION OF EMBODIMENTS

First Embodiment

Hereinafter, a first embodiment of a cooperation system S according to the present invention will be described with reference to FIGS. 1 to 7.

Figure 1:
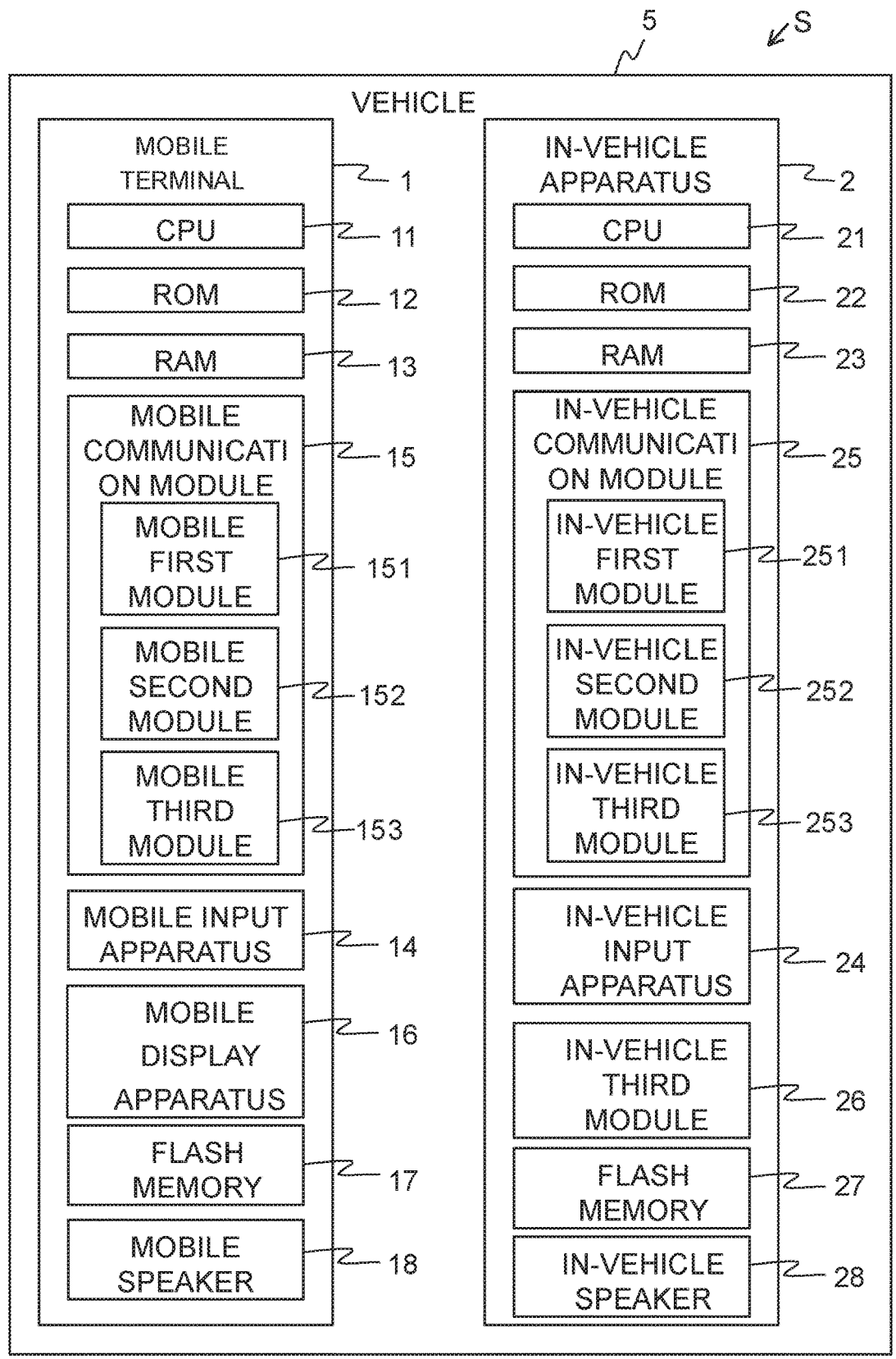
FIG. 1 is a hardware configuration diagram of a cooperation system S.

FIG. 1 is a hardware configuration diagram of the cooperation system S. The cooperation system S includes a mobile terminal 1 and an in-vehicle apparatus 2 that are mounted in a vehicle 5. However, the state here in which the mobile terminal 1 and the in-vehicle apparatus 2 are mounted in the vehicle 5 is illustrated only as one of modes of usage, and the mobile terminal 1 and the in-vehicle apparatus 2 can also be used outside the vehicle 5. The mobile terminal 1 and the in-vehicle apparatus 2 perform cooperative operation by using any of cooperation schemes, which will be described later. Specifically, the mobile terminal 1 transmits an image signal and an audio signal to the in-vehicle apparatus 2, and the image signal and the audio signal are reproduced by the in-vehicle apparatus 2.

The mobile terminal 1 includes a CPU 11 that is a central processing unit, a ROM 12 that is a read-only memory, a RAM 13 that is a readable/writable memory, a mobile communication module 15 that performs communication with the in-vehicle apparatus 2, a mobile input apparatus 14, a mobile display apparatus 16, a flash memory 17, and a mobile speaker 18. The CPU 11 implements functions, which will be described later, by, on the RAM 13, expanding and executing a program stored in the ROM 12. The functions implemented by the CPU 11 include the cooperative operation with the in-vehicle apparatus 2 using any of the cooperation schemes, which will be described later.

The mobile communication module 15 includes a mobile first module 151, a mobile second module 152, and a mobile third module 153. The mobile communication module 15 determines which module can be used to perform communication with the in-vehicle apparatus 2, and conveys the module to an app, which will be described later. However, there are some cases where all the modules can be used to perform communication, and there are some cases where communication cannot be performed by using any of the modules.

The mobile first module 151, the mobile second module 152, and the mobile third module 153 are communication modules that correspond to different physical couplings, respectively. A physical coupling is a communication standard including the first layer of the OSI reference model. Physical couplings include, for example, USB®, Ethernet®, Bluetooth®, ZigBee®, and the like. Note that although the mobile communication module 15 includes the three different modules here, the mobile communication module 15 may include at least one module. Hereinafter, the physical coupling using the mobile first module 151 will also be referred to as "first coupling", the physical coupling using the mobile second module 152 will also be referred to as "second coupling", and the physical coupling using the mobile third module 153 will also be referred to as "third coupling".

A cooperation scheme is a standard related to cooperative operation, and cooperation schemes include, for example, Apple CarPlay®, Android Auto®, Smart Access®, Navi-Con®, Bluetooth Audio®, Bluetooth TEL®, and the like. Each cooperation scheme is used in combination with one or more physical couplings.

The mobile input apparatus 14 is, for example, a plurality of buttons, and receives an input operation made by a user and conveys the input operation to the CPU 11. The mobile display apparatus 16 is, for example, a liquid crystal display, and provides video information to the user based on an operation command from the CPU 11. The flash memory 17 is a nonvolatile memory, and stores one or more applications (hereinafter, referred to as "app"). The mobile speaker 18 is a speaker, and provides audio information to the user based on an operation command from the CPU 11.

The in-vehicle apparatus 2 includes a CPU 21 that is a central processing unit, a ROM 22 that is a read-only memory, a RAM 23 that is a readable/writable memory, an in-vehicle communication module 25 that performs communication with the mobile terminal 1, an in-vehicle input apparatus 24, an in-vehicle display apparatus 26, a flash memory 27, and a mobile speaker 28. The CPU 21 implements functions, which will be described later, by, on the RAM 23, expanding and executing a program stored in the ROM 22. The functions implemented by the CPU 21 include the cooperative operation with the mobile terminal 1 using any of the cooperation schemes.

The in-vehicle communication module 25 includes an in-vehicle first module 251, an in-vehicle second module 252, and an in-vehicle third module 253. The in-vehicle first module 251, the in-vehicle second module 252, and the in-vehicle third module 253 are communication modules that correspond to the same physical couplings to which the mobile first module 151, the mobile second module 152, and the mobile third module 153 correspond, respectively. In other words, the in-vehicle first module 251 is capable of communicating with the mobile first module 151, the in-vehicle second module 252 is capable of communicating with the mobile second module 152, and the in-vehicle third module 253 is capable of communicating with the mobile third module 153.

However, the three communication modules are not necessarily capable of always performing communication. For a wired coupling, at least a cable connection needs to be made by the user, and even for a wireless coupling, an operation for starting communication needs to be made by the user in some cases. Moreover, to perform communication through a physical coupling, it is premised that respective corresponding modules can be used in both the mobile communication module 15 and the in-vehicle communication module 25. Although the mobile communication module 15 includes the three different modules, the mobile communication module 15 may include at least one module.

The in-vehicle input apparatus 24 is, for example, a plurality of buttons, and receives an input operation made by the user and conveys the input operation to the CPU 21. The in-vehicle display apparatus 26 is, for example, a liquid crystal display, and provides video information to the user based on an operation command from the CPU 21. The flash memory 27 is a nonvolatile memory, and stores information, which will be described later. The in-vehicle speaker 28 is a speaker, and provides audio information to the user based on an operation command from the CPU 21. Since the in-vehicle apparatus 2 receives and reproduces an image signal and an audio signal transmitted by the mobile terminal 1 as mentioned above, the in-vehicle display apparatus 26 and the in-vehicle speaker 28 can also be said to be a "reproduction section" that reproduces data outputted by the mobile terminal 1.

(Functional Configuration of the Mobile Terminal 1)

Figure 2:
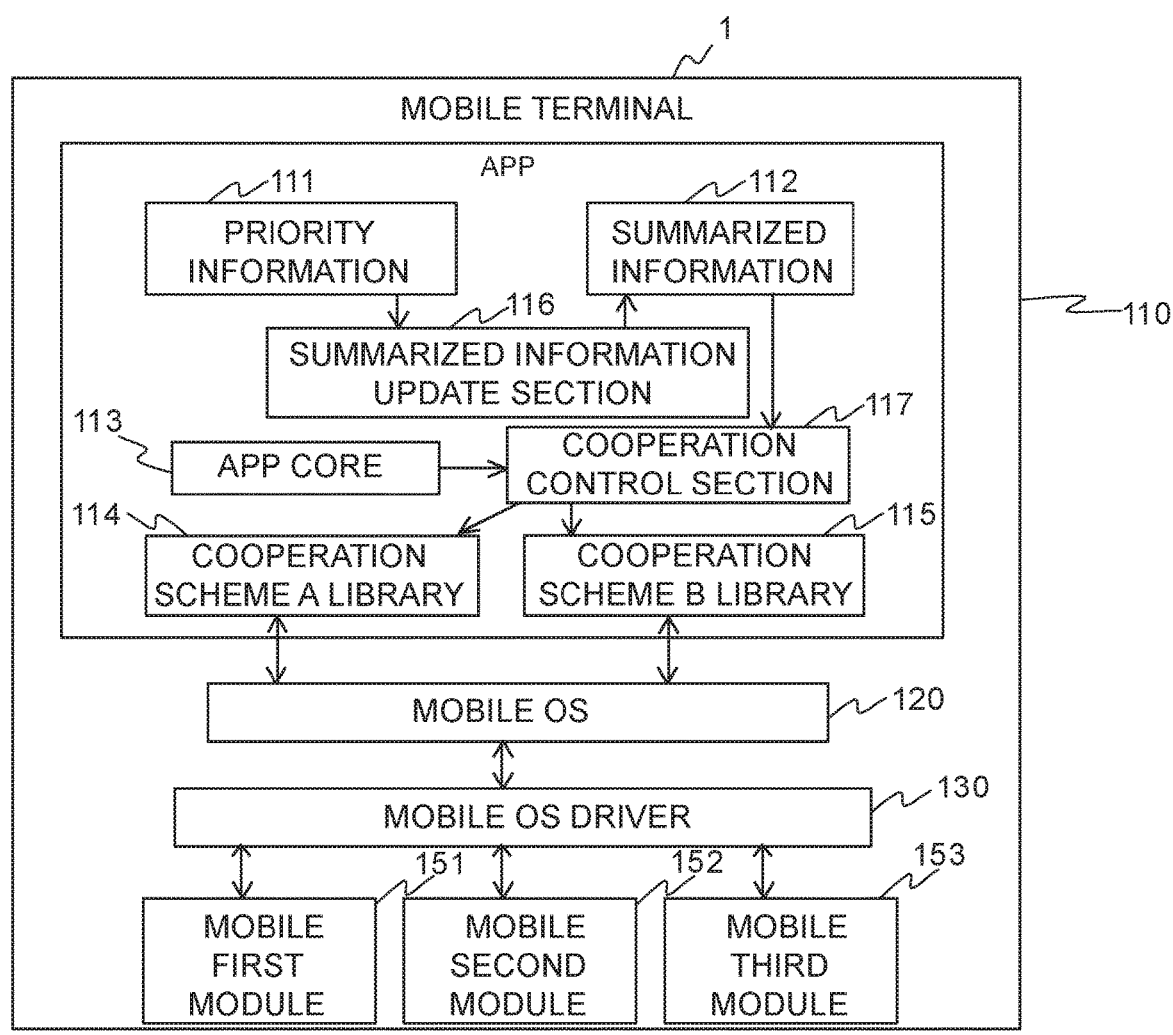
FIG. 2 is a functional configuration diagram of a mobile terminal 1 in a first embodiment.

FIG. 2 is a functional configuration diagram of the mobile terminal 1. The mobile terminal 1 includes an app 110, a mobile OS 120, a mobile OS driver 130, the mobile first module 151, the mobile second module 152, and the mobile third module 153. The app 110 is stored in the flash memory 17, and expanded and executed on the RAM 13 by the CPU 11. The mobile OS 120 is stored in the ROM 12, and expanded and executed on the RAM 13 by the CPU 11. The mobile OS driver 130 is stored in the ROM 12, and expanded and executed on the RAM 13 by the CPU 11.

The app 110 includes priority information 111, summarized information 112, an app core 113, a cooperation scheme A library 114, a cooperation scheme B library 115, a summarized information update section 116, and a cooperation control section 117. The priority information 111 is information with a predetermined content. The summarized information 112 is updated by the summarized information update section 116. A cooperation scheme A and a cooperation scheme B are, for example, any of the plurality of cooperation schemes described above. However, the cooperation scheme A and the cooperation scheme B are different cooperation schemes.

The app core 113 performs computational operation specific to the app 110. For example, when a purpose of the app 110 is navigation, the app core 113 performs computational operation related to pathfinding and route guidance. The app core 113 determines presence or absence of cooperation with the in-vehicle apparatus 2 and, depending on the presence or absence of cooperation, changes an output destination of an image signal, an audio signal, and a notification signal that are required to implement functionality of the app 110. Hereinafter, the image signal, the audio signal, and the notification signal outputted by the app core 113 will be referred to as "output data".

The notification signal is a signal for causing the user who uses at least one of audio and an image to pay attention. The notification signal may include information on audio and an image, and the in-vehicle apparatus 2 that has received the notification signal may reproduce the information on the audio and the image included in the notification signal. The information on the audio and the image to be used for notification may be stored beforehand in the in-vehicle apparatus 2. Both cases may be combined, in which case the notification signal may be configured to include text data and a signal for identifying a notification, and the in-vehicle apparatus 2 may determine audio and an image to reproduce based on the signal for identifying the notification, and output the image combined with the text data included in the notification signal to the in-vehicle display apparatus 26.

When cooperation is disabled, the app core 113 directly outputs the output data to the mobile OS 120, so that the output data is outputted by using the mobile display apparatus 16 and the mobile speaker 18 of the mobile terminal 1. When cooperation is enabled, the app core 113 outputs the output data, together with information for identifying the cooperating in-vehicle apparatus 2, such as an IP address of the in-vehicle apparatus 2, to the cooperation control section 117.

The cooperation scheme A library 114 operates based on an operation command from the cooperation control section 117, and processes information outputted by the app core 113 in accordance with a procedure of the cooperation scheme A and outputs the processed information to the mobile OS 120. However, the cooperation scheme A library 114 outputs, together with the processed information, an output destination of the information and a module to be used for transmission to the mobile OS 120. The cooperation scheme B library 115 operates based on an operation command from the cooperation control section 117, and processes information outputted by the app core 113 in accordance with a procedure of the cooperation scheme B and outputs the processed information to the mobile OS 120. However, the cooperation scheme B library 115 outputs, together with the processed information, an output destination of the information and a module to be used for transmission to the mobile OS 120.

The summarized information update section 116 refers to the priority information 111 and updates the summarized information 112. The summarized information update section 116 updates the summarized information 112 when an operative cooperation scheme is changed, or when an operative physical coupling is changed. The cooperation control section 117 controls cooperative operation of the app 110 with the in-vehicle apparatus 2.

The mobile OS 120 is an operating system of the mobile terminal 1. The mobile OS 120 transmits information outputted from the app 110 to the in-vehicle apparatus 2 by using a designated module. However, since the mobile OS 120 cannot directly control each module, the mobile OS 120 causes the mobile OS driver 130 to implement transmission by outputting an operation command to the mobile OS driver 130.

(Functional Configuration Diagram of the In-Vehicle Apparatus 2)

Figure 3:
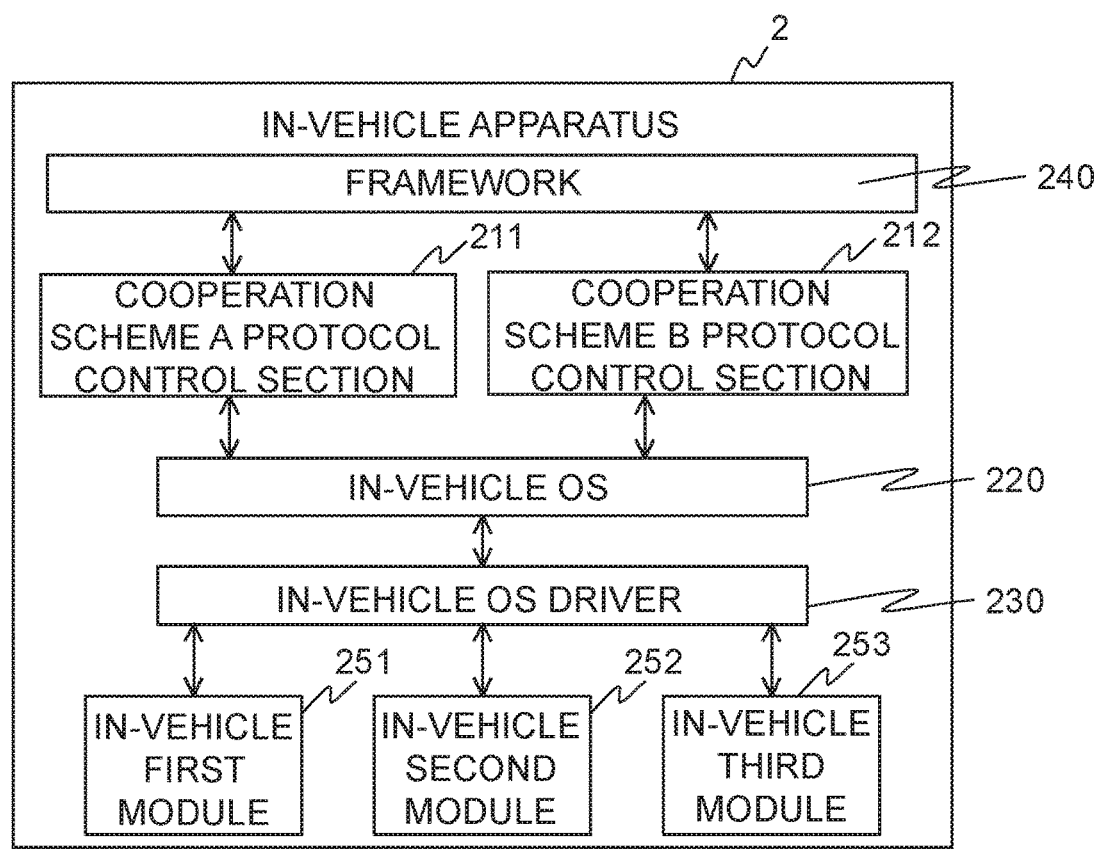
FIG. 3 is a functional configuration diagram of an in-vehicle apparatus 2.

FIG. 3 is a functional configuration diagram of the in-vehicle apparatus 2. The in-vehicle apparatus 2 includes a cooperation scheme A protocol control section 211, a cooperation scheme B protocol control section 212, an in-vehicle OS 220, an in-vehicle OS driver 230, the in-vehicle first module 251, the in-vehicle second module 252, and the in-vehicle third module 253.

The in-vehicle OS 220 is an operating system of the in-vehicle apparatus 2. The in-vehicle OS 220 outputs information received by each module via the in-vehicle OS driver 230 to an appropriate one of the protocol control sections. For example, the in-vehicle OS 220 selects a protocol control section by referring to a header part of the information received by an in-vehicle module and determining a cooperation scheme. The in-vehicle OS 220 outputs received data to the cooperation scheme A protocol control section 211 when determining that the received data is of the cooperation scheme A, and outputs received data to the cooperation scheme B protocol control section 212 when determining that the received data is of the cooperation scheme B.

The cooperation scheme A protocol control section 211 performs communication corresponding to the cooperation scheme A. In other words, operation of the cooperation scheme A protocol control section 211 corresponds to operation of the cooperation scheme A library 114. The cooperation scheme A library 114 interprets information received from the in-vehicle OS 220 in accordance with rules of the cooperation scheme A and outputs the interpreted information to the framework 240. In other words, the cooperation scheme A protocol control section 211 receives output data from the cooperation scheme A library 114. The cooperation scheme B protocol control section 212 performs communication corresponding to the cooperation scheme B. In other words, operation of the cooperation scheme B protocol control section 212 corresponds to operation of the cooperation scheme B library 115. The cooperation scheme B protocol control section 212 interprets information received from the in-vehicle OS 220 in accordance with rules of the cooperation scheme B and outputs the interpreted information to the framework 240. In other words, the cooperation scheme B protocol control section 212 receives output data from the cooperation scheme B library 115.

The framework 240 controls the in-vehicle display apparatus 26 and the in-vehicle speaker 28, based on an operation command from each of the cooperation scheme A protocol control section 211, the cooperation scheme B protocol control section 212, and the in-vehicle OS 220. The framework 240 does not consider duplication of an operation command and therefore, if identical audio output commands are received from both the cooperation scheme A protocol control section 211 and the cooperation scheme B protocol control section 212, makes an identical audio output twice.
(Priority Information 111)

FIG. 4(a) shows an example of the priority information 111. The priority information 111 is created beforehand, and rewriting of the priority information 111 does not occur in the present embodiment. The priority information 111 is presented, for example, in a tabular form, and a combination of a cooperation scheme and a physical coupling and a degree of priority of the combination in use for transmission of each of an image, audio, and a notification are stored in each row.

The number of rows of the priority information 111 is the total number of combinations of a cooperation scheme and a physical coupling that can be used by the app 110 including the priority information 111. Specifically, the example shown in FIG. 4(a) illustrates that for the cooperation scheme A, combinations with the first coupling and the second coupling are possible, and for the cooperation scheme B, combinations with the first coupling and the third coupling are possible. Note that a combination of the cooperation scheme A and the third coupling and a combination of the cooperation scheme B and the second coupling are impossible and therefore not stated in the priority information 111.

A degree of priority, for image, audio, and notification, is represented by an integer equal to or larger than zero, or "F". A smaller integer indicates a higher degree of priority, and "F" indicates that the combination is always used for transmission if the combination is available. As a rule, each of an image, audio, and a notification is transmitted by using any one combination with a highest degree of priority. However, when "F" is set, transmission is performed by using a plurality of combinations in some cases.
(Summarized Information 112)

FIG. 4(b) shows an example of the summarized information 112. The summarized information 112 is created by the summarized information update section 116 referring to the priority information 111. The summarized information update section 116 creates the summarized information 112 each time a physical coupling available to the mobile terminal 1 is changed. As shown in FIG. 4(b), the summarized information 112 is a diagram indicating a combination of a cooperation scheme and a physical coupling to be used for transmission as an "allocation destination", for each of image, audio, and notification. FIG. 4(b) shows the summarized information 112 that is created when all cooperation schemes and all physical couplings in FIG. 4(a) are available. Specifically, an image is transmitted by using the combination of the cooperation scheme A and the first coupling and the combination of the cooperation scheme B and the first coupling, both of which have a degree of priority of "F" in FIG. 4(a), audio is transmitted by using the combination of the cooperation scheme B and the third coupling, which has a degree of priority of "0", and a notification is transmitted by using the combination of the cooperation scheme A and the first coupling, which has a degree of priority of "0".
(Data Flow)

Figure 5:
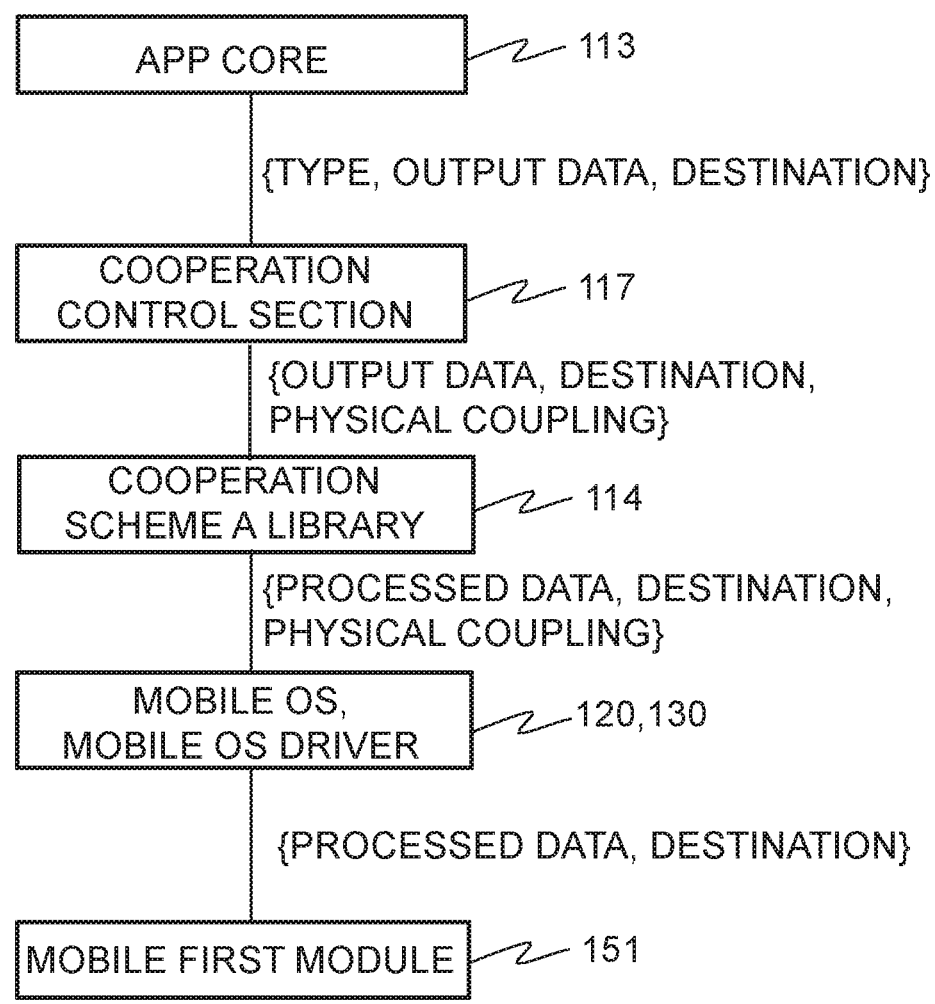
FIG. 5 shows a data flow in the mobile terminal 1.

FIG. 5 shows a data flow in the mobile terminal 1. More specifically, FIG. 5 illustrates a flow of output data outputted by the app core 113 until the output data arrives at the mobile communication module 15. When an image, audio, or a notification to be outputted to the in-vehicle apparatus 2 performing cooperative operation occurs, the app core 113 outputs information on a type, output data, and a destination to the cooperation control section 117. The "type" here is information indicating one of an image signal, an audio signal, and a notification signal, and may be configured to be integral with the output data. The "destination" is information for identifying the in-vehicle apparatus 2 in communication, and is, for example, the IP address of the in-vehicle apparatus 2.

The cooperation control section 117 identifies a cooperation scheme and a physical coupling to be used for outputting the received data, and transmits information indicating the output data, the destination, and the physical coupling to a library corresponding to the identified cooperation scheme. For example, when the cooperation scheme to be used for transmission of the received output data is A, the cooperation control section 117 outputs the above-mentioned information to the cooperation scheme A library 114.

The cooperation scheme A library 114 processes the received data such that the received data is adapted to the cooperation scheme A. The cooperation scheme A library 114 outputs the processed output data (hereinafter, referred to as "processed data"), together with the received information indicating the destination and the physical coupling, to the mobile OS 120. The mobile OS 120 outputs the processed data and the destination to a module identified by the received information indicating the physical coupling, by using the cooperation OS driver 130. For example, when the communication module corresponding to the physical coupling identified by the received information indicating the physical coupling is the mobile first module 151, the mobile OS driver 130 outputs the processed data and the destination to the mobile first module 151.

To summarize the data flow described above, the destination, of the information outputted by the app core 113, is conveyed to the mobile communication module 15, without being changed. The output data outputted by the app core 113 is processed by the cooperation scheme A library 114 or the cooperation scheme B library 115 and then conveyed to the mobile communication module 15.
(Flowchart of the Summarized Information Update Section 116)

Figure 6:
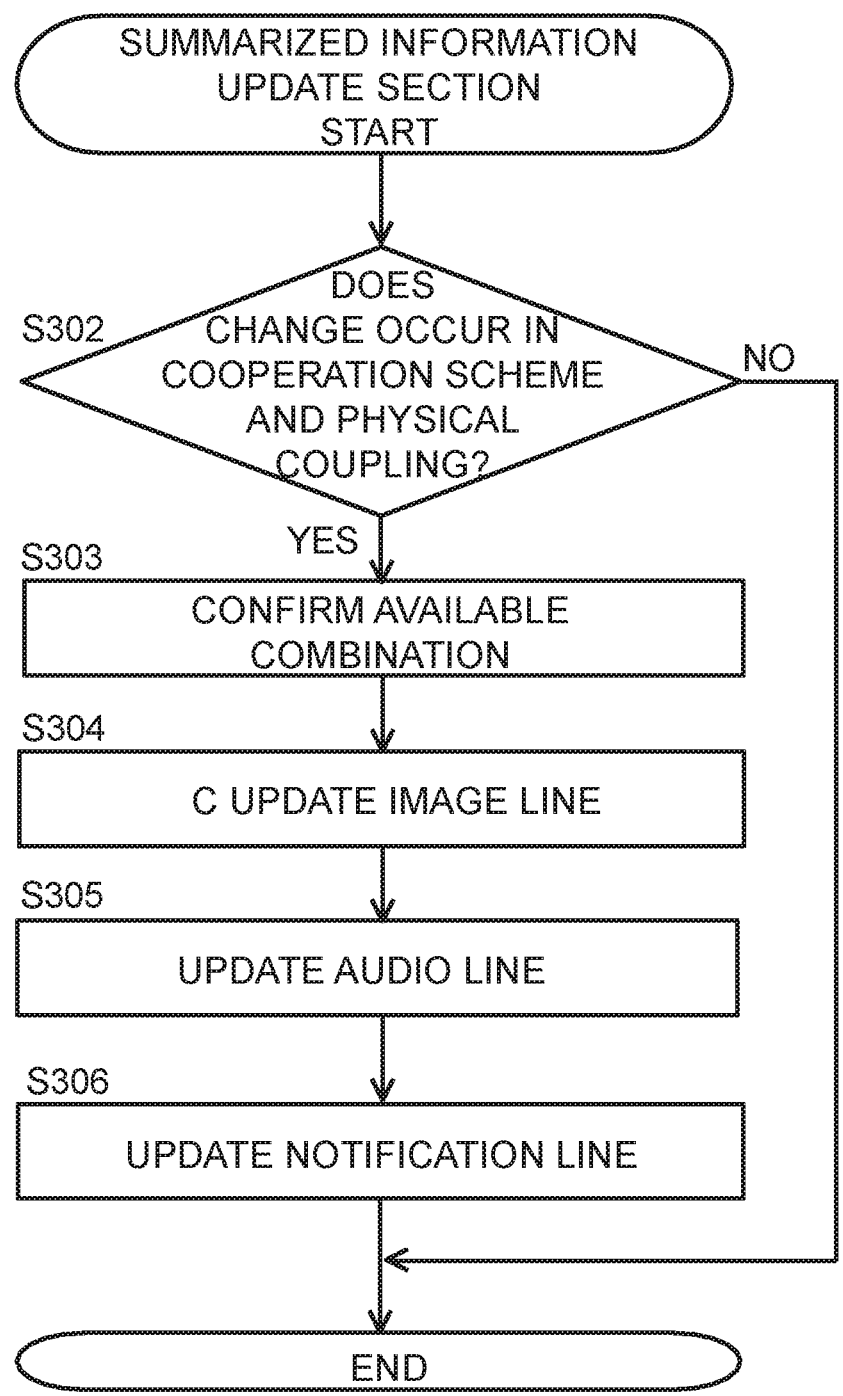
FIG. 6 is a flowchart representing operation of a summarized information update section 116.

FIG. 6 is a flowchart representing operation of the summarized information update section 116. An entity that executes each step described below is the CPU 11. The summarized information update section 116 executes processing described below in each predetermined period, for example, every one second.

First in S302, the summarized information update section 116 determines whether or not a change has occurred in at least one of an operative cooperation scheme and an operative physical coupling since S302 was executed last time. The summarized information update section 116 advances to S303 when determining that a change has occurred, and terminates the processing shown in FIG. 6 when determining that a change has not occurred. Information on the operative cooperation scheme can be acquired by inquiring of the cooperation control section 117. Information on the operative physical coupling can be acquired by inquiring of the mobile communication module 15.

In S303, the summarized information update section 116 confirms a combination or combinations of a cooperation scheme and a physical coupling that are currently available, in other words, that are currently operative. Specifically, among the plurality of combinations stated on a left end of the priority information 111, the summarized information update section 116 identifies a currently operative combination or combinations. In subsequent S304, the summarized information update section 116 refers to the priority information 111, identifies a combination to be used for transmission of an image signal from among the currently operative combination or combinations of a cooperation scheme and a physical coupling confirmed in S303, and updates the line of image in the summarized information 112. The combination to be used for transmission of an image signal is a combination of a cooperation scheme and a physical coupling with a highest degree of priority, that is, with a smallest number, among the currently operative combination or combinations. However, if "F" is present, the combination to be used for transmission of an image is every combination with a degree of priority of "F".

In subsequent S305, the summarized information update section 116 refers to the priority information 111, identifies a combination to be used for transmission of an audio signal from among the currently operative combination or combinations of a cooperation scheme and a physical coupling confirmed in S303, and updates the line of audio in the summarized information 112. In subsequent S306, the summarized information update section 116 refers to the priority information 111, identifies a combination to be used for transmission of a notification signal from among the currently operative combination or combinations of a cooperation scheme and a physical coupling confirmed in S303, and updates the line of notification in the summarized information 112. Contents of the processing in S305 and S306 are identical, only with a difference in the lines that are referred to in the priority information 111. The foregoing is the operation of the summarized information update section 116.

(Flowchart of the Cooperation Control Section 117)

Figure 7:
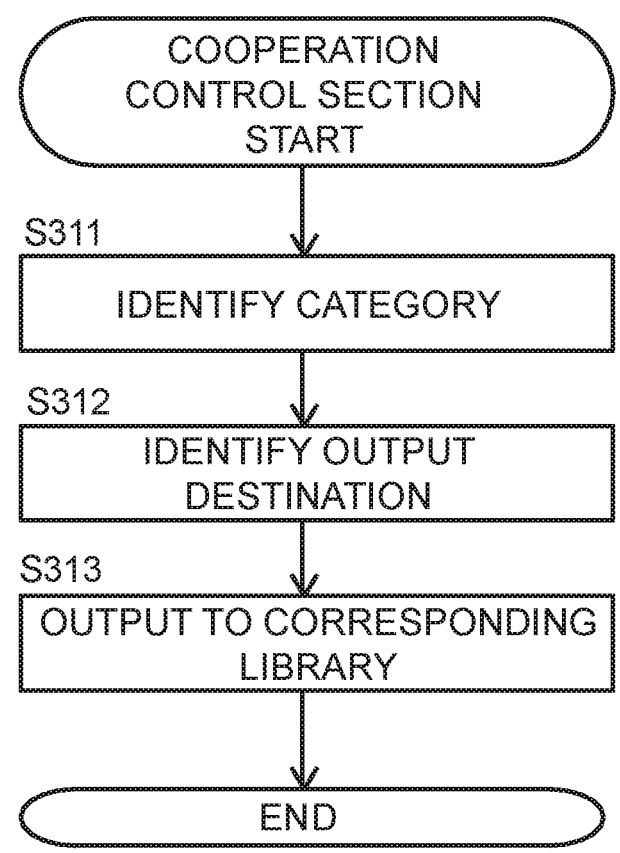
FIG. 7 is a flowchart representing operation of a cooperation control section 117.

FIG. 7 is a flowchart representing operation of the cooperation control section 117. An entity that executes each step described below is the CPU 11. The cooperation control section 117 executes processing shown in FIG. 7 each time data is outputted from the app core 113.

First in S311, the cooperation control section 117 identifies a category of data outputted from the app core 113. Specifically, it is identified which one of an image, audio, and a notification data outputted from the app core 113 is. The identification of a category may be performed by referring to a header part of the data, or may be performed in such manner that the app core 113 separately outputs information indicating a type of the data, and the cooperation control section 117 performs determination by referring to the information.

In subsequent S312, the cooperation control section 117 refers to the summarized information 112, and identifies an allocation destination of the category identified in S312. For example, in the example shown in FIG. 4(*b*), when the category is "audio", an allocation destination is identified as "cooperation scheme A—first coupling". In subsequent S313, the cooperation control section 117 outputs the data outputted from the app core 113, to a library of the cooperation scheme identified in S312. However, at the time, the cooperation control section 117 also outputs information indicating the physical coupling together. The foregoing is the operation of the cooperation control section 117.

According to the above-described first embodiment, following operation and effects can be obtained.

(1) The cooperation system S includes the mobile terminal 1 and the in-vehicle apparatus 2 that can be coupled according to the plurality of cooperation schemes by using the plurality of physical couplings. The mobile terminal 1 includes: the app 110 that outputs at least one of an audio signal and an image signal as output data; the cooperation control section 117 that determines a cooperation scheme to be used for transmission of the output data, based on a cooperation scheme or cooperation schemes that are operatively functioning; and the cooperation scheme A library 114 and the cooperation scheme B library 115 that transmit the output data to the in-vehicle apparatus 2 by using the cooperation scheme determined by the cooperation control section 117. The in-vehicle apparatus 2 includes: the cooperation scheme A protocol control section 211 that receives the output data from the cooperation scheme A library 114 by using the cooperation scheme A; the cooperation scheme B protocol control section 212 that receives the output data from the cooperation scheme B library 115; and the in-vehicle display apparatus 26 and the in-vehicle speaker 28 that reproduce the output data received by the cooperation scheme A protocol control section 211 and the cooperation scheme B protocol control section 212. Accordingly, when a plurality of cooperation schemes are available, the user is not confused by appropriately setting the priority information 111 because output data is outputted by using a cooperation scheme determined by the cooperation control section 117.

For example, when a plurality of cooperation schemes are available, it is conceivable that data is transmitted by using all the available cooperation schemes unless special control is performed. In such a case, since the in-vehicle apparatus 2 receives as many data as the number of the available cooperation schemes, processing of the plurality of data received may throw the user into confusion.

It is conceivable that the confusion of the user is avoided by adding a function to the in-vehicle apparatus 2 and, when the plurality of cooperation schemes receive identical data, processing only any one of the received data. However, following three problems are possible. Firstly, when the mobile terminal 1 intentionally transmits identical data multiple times, the data redundantly transmitted results in being ignored, and such a situation is not preferable. Secondly, it is unclear how strictly parity of data and time coincidence are determined, and such unclarity may further confuse the user. Thirdly, addition of a function to, that is, an update of the in-vehicle apparatus 2 is not necessarily easy. In contrast, an update of an app incorporated in the mobile terminal 1 is easy, and addition of the function as described in the present embodiment is also easy. Accordingly, it is preferable to devise something on a mobile terminal 1 side that transmits data.

(2) The mobile terminal 1 and the in-vehicle apparatus 2 can be coupled by using the plurality of physical couplings, and the cooperation control section 117 determines a physical coupling to be used for transmission of output data. Accordingly, when the plurality of physical couplings are available, the user is not confused by appropriately setting the priority information 111 because output data is outputted by using a physical coupling determined by the cooperation control section 117. Convenience can be enhanced by appropriately setting the priority information 111 with consideration given to characteristics of the physical couplings because even in the same cooperation scheme, differences arise in transmission rate and robustness due to the different characteristics of the physical couplings.

(3) The mobile terminal 1 includes the flash memory 17 that stores: the summarized information 112 in which a cooperation scheme to be used for transmission of each of an audio signal and an image signal included in output data is stated; and the priority information 111 in which a degree of priority in use for transmission of each of an audio signal and an image signal included in output data is set on each cooperation scheme. The mobile terminal 1 includes the summarized information update section 116 that determines an operatively functioning cooperation scheme or cooperation schemes, determines a cooperation scheme to be used for transmission of each of an audio signal and an image signal by referring to the priority information 111, and updates the summarized information 112. The cooperation control section 117 refers to the summarized information 112 and determines a cooperation scheme to transmit output data.

(4) Output data includes an audio signal and an image signal. In the priority information 111, a degree of priority in use for transmission is set for each of the audio signal and the image signal. In the summarized information 112, a cooperation scheme to be used for transmission is stated for each of the audio signal and the image signal. The summarized information update section 116 determines a cooperation scheme to be used for transmission of each of the audio signal and the image signal, and updates the summarized information. The cooperation control section 117 determines which one of the audio signal and the image signal the output data is, and determines a cooperation scheme to be used for transmission of the output data, based on the summarized information 112. Accordingly, a cooperation scheme to be used for transmission can be determined for each of the audio signal and the image signal independently of each other. Thus, it is possible that the audio signal is transmitted by using only one cooperation scheme and the image signal is transmitted by using a plurality of cooperation schemes. Since a cooperation scheme, due to a characteristic thereof, is excellent in transmission of one of the audio signal and the image signal in some cases, it is effective that a cooperation scheme is selected for each signal.

(5) Output data includes a notification that causes a user who uses at least one of an audio signal and an image signal to pay attention. In the summarized information 112, a cooperation scheme to transmit the notification is stated. In the priority information 111, a degree of priority in use for transmission of the notification is set on each cooperation scheme. The summarized information update section 116 determines an operatively functioning cooperation scheme or cooperation schemes, determines a cooperation scheme to transmit the notification by referring to the priority information 111, and updates the summarized information 112. When the same notification is made multiple times, since the user recognizes that there are a plurality of targets of the notifications, it is highly probable that the user is confused if only one notification is actually made. Accordingly, such confusion of the user can be avoided by appropriately setting the priority information 111.

Modification Example 1

The mobile terminal 1 and the in-vehicle apparatus 2 may be able to be coupled by using only one physical coupling. For example, the mobile communication module 15 may include only the mobile first module 151, and the in-vehicle communication module 25 may include only the in-vehicle first module 251. However, in such a case, both the cooperation scheme A and the cooperation scheme B support the physical coupling to which the mobile first module 151 and the in-vehicle first module 251 correspond.

Modification Example 2

Each cooperation scheme may support only one physical coupling. In other words, even when the cooperation schemes support only one physical coupling, it is only necessary that the mobile terminal 1 and the in-vehicle apparatus 2 support a plurality of common cooperation schemes.

Modification Example 3

The priority information 111 and the summarized information 112 are described as in the tabular forms in the first embodiment. However, a form for storage is not limited to the tabular form, and the priority information 111 and the summarized information 112 may be stored in the flash memory 17 in various forms. For example, the information stored in each cell in the summarized information 112 may be written in text.

Modification Example 4

Although the priority information 111 and the summarized information 112 are described as information incorporated in the app 110, the priority information 111 and the summarized information 112 may be stored in the flash memory 17 independently of the app 110. Moreover, in such a case, the app 110 may be stored in the ROM 12.

Modification Example 5

In the priority information 111, all in the line of image may be set to "F". The reason is that the user may be hardly confused even when identical image information is transmitted to the in-vehicle apparatus 2 from the mobile terminal 1 by using the plurality of cooperation schemes and the plurality of physical couplings.

Modification Example 6

In the above-described first embodiment, a degree of priority is set for each of image, audio, and notification individually in the priority information 111. However, a degree of priority common to all of image, audio, and notification may be set. In such a case, the summarized information 112 does not need to be stated for the individual functions in a divided manner, and may have one line. Moreover, according to the present modification example, an image, audio, and a notification are transmitted by using a common combination of one cooperation scheme and one coupling scheme.

Second Embodiment

A second embodiment of the cooperation system S will be described with reference to FIGS. 8 to 12. In the description below, components identical or similar to the components in the first embodiment are denoted by identical or similar reference signs, and different points will be mainly described. Matters that are not particularly described are identical or similar to the first embodiment. The present embodiment is different from the first embodiment mainly in a point that when a user makes an operational input into an in-vehicle apparatus during cooperative operation, the in-vehicle apparatus conveys the input to a mobile terminal. A hardware configuration of the cooperation system S is similar to the hardware configuration in the first embodiment.

(Outline of the Second Embodiment)

In the present embodiment, when the mobile terminal 1 and the in-vehicle apparatus 2 perform cooperative operation, a display having a user interface (hereinafter, referred to as "UI") operable by a user can be rendered on the in-vehicle display apparatus 26 of the in-vehicle apparatus 2. When the user operates the UI by using the in-vehicle input apparatus 24, information on the operation is conveyed from the in-vehicle apparatus 2 to the mobile terminal 1. At the time, the in-vehicle apparatus 2 conveys the inputted information to the mobile terminal 1 by using a protocol control section and a physical coupling that output the displayed information. Details will be given later.

(Examples of a Screen Display)

FIG. 8 shows examples of screens displayed on the in-vehicle display apparatus 26, in which FIG. 8(*a*) shows a screen with UI 261 and FIG. 8(*b*) shows a screen without UI 262. Each of FIG. 8(*a*) and FIG. 8(*b*) shows a screen of an app that reproduces music. The mobile terminal 1 causes the in-vehicle apparatus 2 to display the screen with UI 261 or the screen without US 262, by changing outputted information depending on a cooperation scheme and a physical coupling, which will be described later. However, an app may exist that only outputs an image signal for displaying the screen without UI 262.

In the screen with UI 261 shown in FIG. 8(*a*), a title of music that is being reproduced is displayed in an upper line, an entire length of the music and a reproduction position are displayed in a middle line, and a UI with which reproducing and stopping the music and the like can be operated is displayed on a lower line. In other words, the screen with UI 261 includes a display part denoted by a reference sign 26R and a UI part denoted by a reference sign 26P. In the screen without UI 262 shown in FIG. 8(*b*), a title of music that is being reproduced is displayed in an upper line, and an entire length of the music and a reproduction position are displayed in a lower line. In other words, the screen without UI 262 includes only the display part denoted by the reference sign 26R, and does not include the UI part.

Note that when the in-vehicle apparatus 2 displays the screen with UI 261, the mobile terminal 1 transmits not only the displayed image information, but also transmits an operable area and an identifier indicating the area together. Hereinafter, the operable area and the identifier indicating the area will be referred to as "UI information". For example, five buttons, namely, a back button, a play button, a pause button, a stop button, and a forward button, are displayed in FIG. 8(*a*), and for each button, information on the area and the identifier is transmitted from the mobile terminal 1. The area is represented, for example, by a combination of an upper-left coordinate and a lower-right coordinate of each button when an upper left of the image is assumed to be an origin, that is, (0, 0). The identifier is, for example, a character string such as "btn1" or "btn2".

(Functional Configuration of the Mobile Terminal 1)

Figure 9:
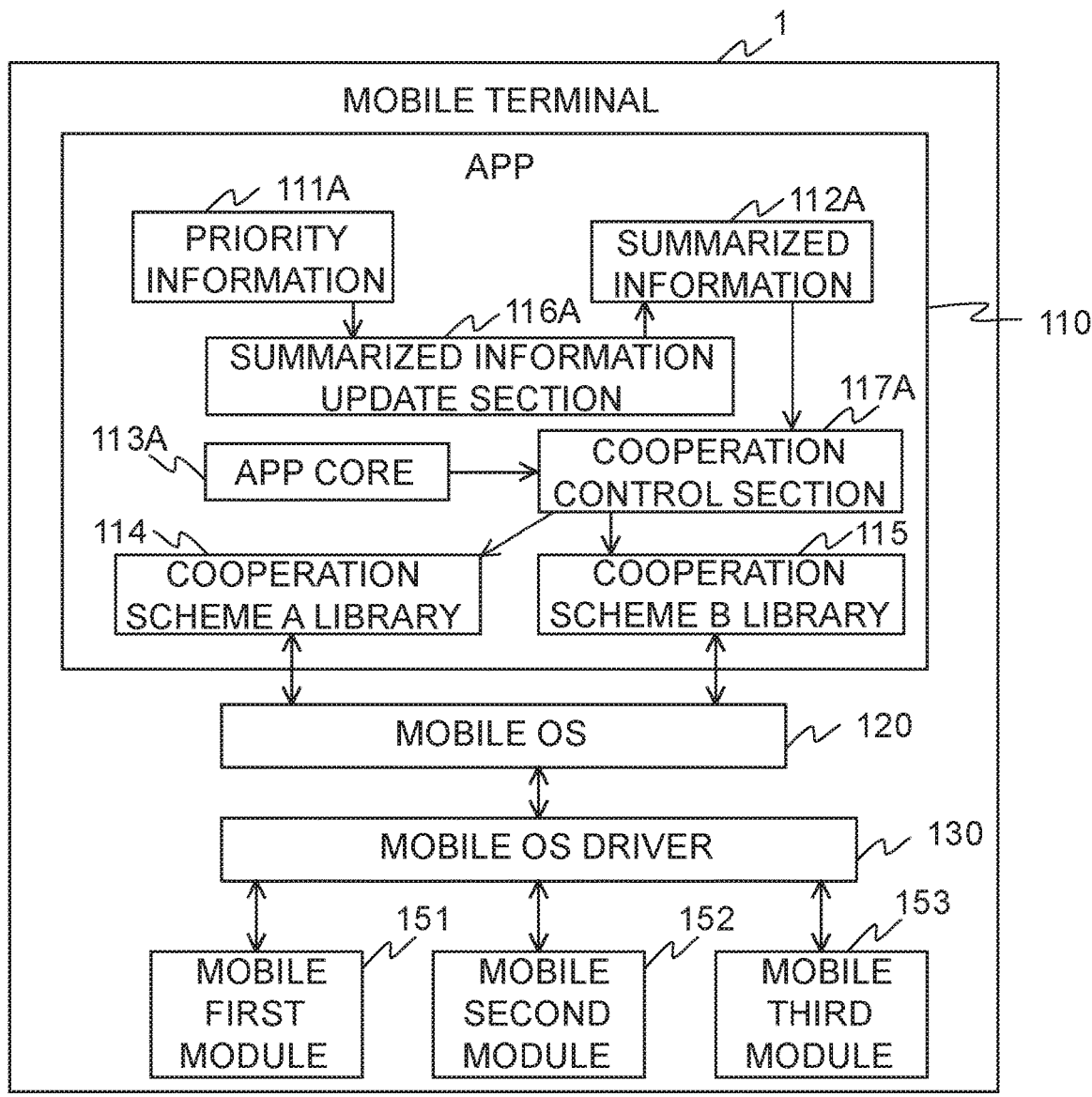
FIG. 9 is a functional configuration diagram of a mobile terminal 1 in a second embodiment.

FIG. 9 is a functional configuration diagram of the mobile terminal 1 in the second embodiment. A different point from the first embodiment is that priority information 111A, summarized information 112A, a summarized information update section 116A, an app core 113A, and a cooperation control section 117A are included in place of the priority information 111, the summarized information 112, the summarized information update section 116, the app core 113, and the cooperation control section 117, respectively.

FIG. 10(*a*) shows an example of the priority information 111A in the second embodiment, and FIG. 10(*b*) shows an example of the summarized information 112A in the second embodiment. The priority information 111A additionally includes a column of "image with UI", in comparison with the priority information 111 in the first embodiment. The column indicates a degree of priority in use for transmission of information for displaying the screen with UI 261 as shown in FIG. 8(*a*). Moreover, in the present embodiment, a column of "image" indicates a degree of priority in use for transmission of an image for displaying the screen without UI 262 as shown in FIG. 8(*b*). In the present embodiment, the information in the priority information 111A is also preset, and is not updated.

The summarized information 112A additionally includes a row of "image with UI", in comparison with the summarized information 112 in the first embodiment. The row indicates a combination of a cooperation scheme and a physical coupling to be used for transmission of the information for displaying the screen with UI 261 as shown in FIG. 8(*a*). Moreover, in the present embodiment, a row of "image" indicates a combination of a cooperation scheme and a physical coupling to be used for transmission of the image for displaying the screen without UI 262 as shown in FIG. 8(*b*). The summarized information 112A is updated by the summarized information update section 116A. Referring back to FIG. 9, the description will be continued.

The summarized information update section 116A also updates the row of "image with UI" in the summarized information 112A, in addition to the operation in the first embodiment. When the app core 113A outputs an image, the app core 113A outputs not only image information included the screen without UI 262, but also information for creating the screen with UI 261. The cooperation control section 117A determines a category of the information outputted by the app core 113A, refers to the summarized information 112A, and outputs the information to the cooperation scheme A library 114 or the cooperation scheme B library 115.

(Operation of the Summarized Information Update Section 116A)

Figure 11:
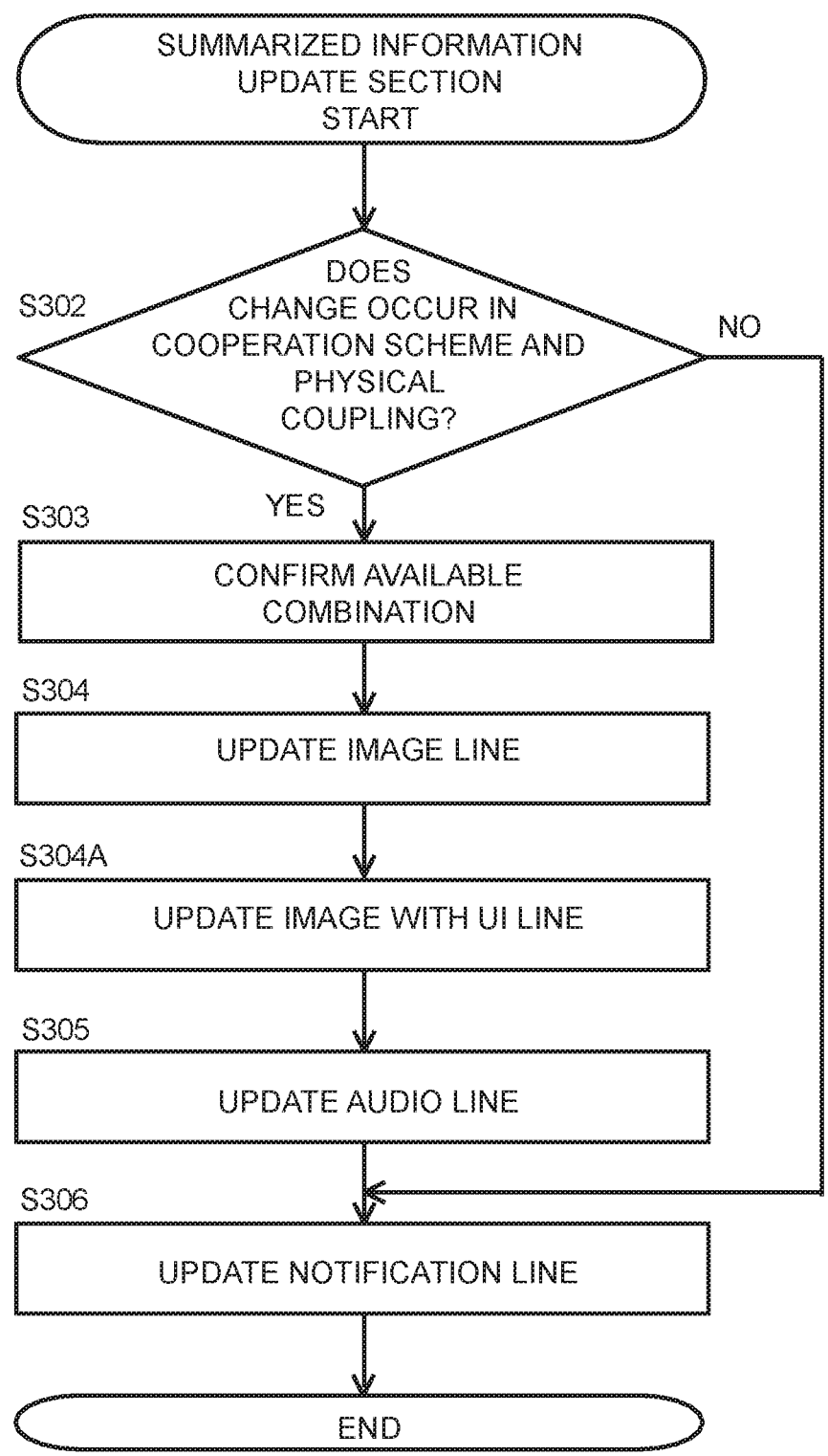
FIG. 11 is a flowchart representing operation of a summarized information update section 116A.

FIG. 11 is a flowchart representing operation of the summarized information update section 116A. S304A is added after S304, in comparison with the flowchart in the first embodiment. In S304A, the summarized information update section 116A refers to the priority information 111, identifies a combination to be used for transmission of an image with UI from among a currently operative combination or combinations of a cooperation scheme and a physical coupling confirmed in S303, and updates the line of image with UI in the summarized information 112A. The summarized information update section 116A next advances to S305, in and after which processing similar to the processing in the first embodiment is performed.

(Operation of the Cooperation Control Section 117A)

Figure 12:
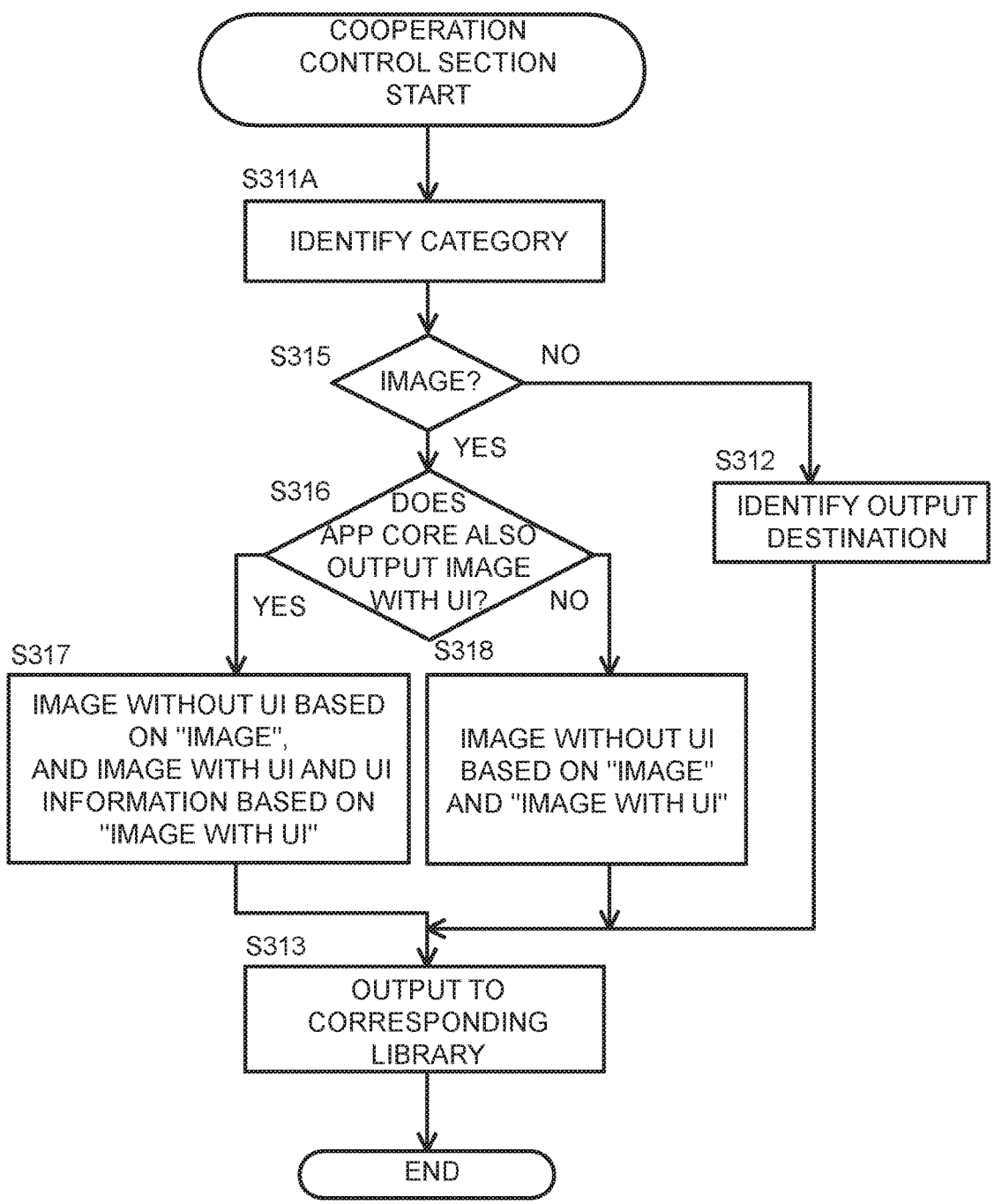
FIG. 12 is a flowchart representing operation of a cooperation control section 117A.

FIG. 12 is a flowchart representing operation of the cooperation control section 117A. First in S311A, the cooperation control section 117 identifies a category of output data outputted from the app core 113. In other words, it is identified which one of an image, audio, and a notification output data is. However, when the app core 113 outputs an image, there is a case where only an image without UI is outputted, and there is a case where an image without UI, an image with UI, and UI information are outputted together. In any of the cases, the cooperation control section 117A determines that the category is "image" in the present embodiment.

In subsequent S315, the cooperation control section 117A determines whether or not the category identified in S311A is "image". The processing advances to S316 when it is determined that the category is "image", and the processing advances to S312 when it is determined that the category is not "image". Processing in and after S312 is similar to the processing in the first embodiment, and therefore a description thereof is omitted. In S316, the cooperation control section 117A determines whether or not the app core 113A also outputs an image with UI. The processing advances to S317 when it is determined that an image with UI is also outputted, and the processing advances to S318 when only an image without UI is outputted.

In S317, the cooperation control section 117A identifies a combination stated in the row of "image" in the summarized information 112A as an output destination of the image without UI, identifies a combination stated in the row of "image with UI" as an output destination of the image with UI and the UI information, and then advances to S313. However, when identical combinations are stated for "image" and "image with UI" in the summarized information 112A, the cooperation control section 117A prioritizes "image with UI". For example, when "cooperation scheme A—first coupling" is stated for both "image" and "image with UI" as in the example shown in FIG. 10(b), determination is made as follows. Specifically, to the combination of "cooperation scheme A—first coupling", the cooperation control section 117A outputs the image with UI and the UI information, and does not output the image without UI.

In S318, the cooperation control section 117A identifies combinations stated in the rows of "image" and "image with UI" in the summarized information 112A as output destinations of the image without UI, that is, as combinations to be used for transmission, and then advances to S313. However, even when identical combinations are stated for "image" and "image with UI" in the summarized information 112A, the cooperation control section 117A uses the combinations for transmission of the one "image without UI". The processing in S313 is as described in the first embodiment.

(Operation of the In-Vehicle Apparatus 2)

Operation of the in-vehicle apparatus 2 is similar to the operation in the first embodiment, except a following point. In the second embodiment, information for identifying a module that receives information from the mobile terminal 1 is conveyed to the framework 240 via the in-vehicle OS driver 230, the in-vehicle OS 220, and a protocol control section. The protocol control section that conveys the information is a protocol control section that processes the information received from the mobile terminal 1. The framework 240 temporarily stores the conveyed information for identifying the module and information about which one of the protocol control sections has conveyed the information, and uses such information in processing described below.

When an image with UI and UI image are received from any one of the protocol control sections, the framework 240 displays the image including an UI on the in-vehicle display apparatus 26. Then, when an input is received from the user, the framework 240 conveys the input to the mobile terminal 1 by using a similar combination of a cooperation scheme and a physical coupling to the combination at the time of reception. For example, when an input is received by the in-vehicle input apparatus 24 while the image with UI transmitted by the mobile terminal 1 using the combination of the cooperation scheme A and the first coupling is being reproduced, the input is conveyed to the mobile terminal 1 by using the cooperation scheme A protocol control section 211 and the in-vehicle first module 251.

According to the above-described second embodiment, following operation and effects can be obtained.

(6) An image signal outputted by the app 110A includes an image-with-UI signal outputted together with UI information, and an image-without-UI signal. The cooperation control section 117A determines respective cooperation schemes to output the image-with-UI signal and the image-without-UI signal, based on operatively functioning cooperation schemes. The in-vehicle apparatus 2 includes the in-vehicle input apparatus 24 and the framework 240. Accordingly, the mobile terminal 1 can transmit each of an image with UI and an image without UI according to an appropriate cooperation scheme, respectively. The in-vehicle apparatus 2 can convey an input from the user to the mobile terminal 1 by using a combination of a physical coupling and a cooperation scheme that is used for transmission of the image with UI.

In each embodiment and each modification example described above, the mobile terminal 1 may include an input/output interface (not shown), and a program may be read from another apparatus via a medium that can be used by the input/output interface and the mobile terminal 1, when necessary. Here, the medium is, for example, a recording medium that is attachable to and removable from the input/output interface, or a communication medium, which, more specifically, refers to a wired, wireless, or optical network or the like, or carrier waves or a digital signal propagated through such a network. One or some, or all, of functions implemented by the program may be implemented by a hardware circuit or an FPGA.

Figure 13:
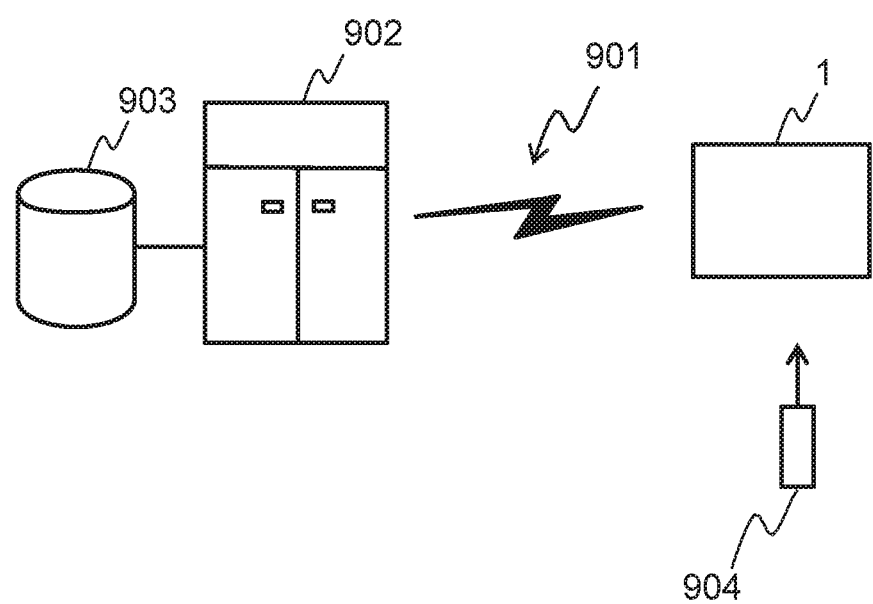
FIG. 13 is a diagram for describing a computer program product.

FIG. 13 shows a mode of providing information such as the above-described operation program, table, or file to the mobile terminal 1 via the recording medium or a data signal. The mobile terminal 1 includes a processor that is capable of executing various programs. The mobile terminal 1 is provided, via a USB memory 904, with information such as the operation program, such as the app 110, for implementing each processing described above. The mobile terminal 1 includes a function of coupling to a communication circuit 901. A computer 902 is a server computer that provides the above-mentioned information such as the operation program, and stores the information in a recording medium such as a hard disk 903. The communication circuit 901 is the Internet, a communication circuit for personal computer communication or the like, or a dedicated communication circuit. The computer 902 reads the information such as the operation program by using the hard disk 903, and transmits the information to the mobile terminal 1 via the communication circuit 901. In other words, the program is transmitted as a data signal over carrier waves via the communication circuit 901. In such a manner, the program for causing the mobile terminal 1 to operate can be provided as a computer-readable computer program product in various forms such as the recording medium and the data signal (carrier waves).

Each embodiment and each modification example described above may be combined with each other. In the foregoing, although the various embodiments and modification examples have been described, the present invention is not limited to the contents of such embodiments and modification examples. Other conceivable aspects within the scope of the technical idea of the present invention are included in the scope of the present invention.

The disclosure of the priority basic application, Japanese Patent Application No. 2018-73191 (filed on Apr. 5, 2018), is incorporated herein by reference.

REFERENCE SIGNS LIST

1 Mobile terminal
2 In-vehicle apparatus
15 Mobile communication module
16 Mobile display apparatus
17 Flash memory
24 In-vehicle input apparatus
25 In-vehicle communication module
26 In-vehicle display apparatus
110 App
111 Priority information
112 Summarized information
113 App core
114 Cooperation scheme A library
115 Cooperation scheme B library
116 Summarized information update section
117 Cooperation control section
151 Mobile first module
152 Mobile second module
153 Mobile third module
211 Cooperation scheme A protocol control section
212 Cooperation scheme B protocol control section
240 Framework

The invention claimed is:

1. A cooperation system comprising a mobile terminal and an in-vehicle apparatus coupled according to a plurality of cooperation schemes by using one or more physical couplings,
wherein the mobile terminal includes:
a memory for storing an application that outputs an audio signal and an image signal as output data;
a controller that determines a selected cooperation scheme to be used for transmission of the output data, based on a current cooperation scheme that is currently functioning; and
a library stored in the memory that transmits the output data to the in-vehicle apparatus by using the selected cooperation scheme determined by the controller, and
the in-vehicle apparatus includes:
a transmission protocol controller that receives the output data from the library by using the selected cooperation scheme; and
an output device that reproduces the output data received by the transmission protocol controller,
wherein the mobile terminal:
stores summarized information for which the selected cooperation scheme to be used for transmission of each of the audio signal and the image signal included in the output data is stated, and priority information in which a degree of priority in use for transmission of each of the audio signal, and the image signal included in the output data is set on each of the cooperation schemes, in the memory, wherein the summarized information includes a combination of a cooperation scheme and a physical coupling to be used for transmission, and wherein the summarized information and the priority information are different from each other;
determines the current cooperation scheme that is currently functioning, determines the selected cooperation scheme to be used for transmission of each of the audio signal and the image signal by referring to the priority information stored in the memory based on the current cooperation scheme, and updates the summarized information stored in the memory based on the selected cooperation scheme determined to be used for transmission; and
determines the selected cooperation scheme to be used for transmission of the output data by referring to the updated summarized information.

2. The cooperation system according to claim 1,
wherein the mobile terminal and the in-vehicle apparatus can be coupled by using a plurality of the physical couplings, and
the controller determines the physical coupling to be used for transmission of the output data.

3. The cooperation system according to claim 1
wherein
in the priority information, the degree of priority in use for transmission is set with respect to each of the audio signal and the image signal,
in the summarized information, the cooperation scheme to be used for transmission is stated with respect to each of the audio signal and the image signal,
the mobile terminal determines the selected cooperation scheme to be used for transmission of each of the audio signal and the image signal, and updates the summarized information, and determines the selected cooperation scheme to be used for transmission of the output data, based on determination as to which one of the audio signal and the image signal the output data is, and based on the summarized information.

4. The cooperation system according to claim 1,
wherein the output data includes a notification that causes a user who uses at least one of an audio and an image to pay attention,
in the summarized information, the cooperation scheme to be used for transmission of the notification is further stated,
in the priority information, a degree of priority in use for transmission of the notification is further set on each of the cooperation schemes, and
the mobile terminal further determines the cooperation scheme that is operatively functioning, determines the cooperation scheme to be used for transmission of the notification by referring to the priority information, and updates the summarized information.

5. The cooperation system according to claim 1,
wherein the image signal outputted by the application includes an image with an user interface (UI) signal for displaying a user interface that allows a user to make an operational input, and an image-without-the UI signal for displaying an image that does not allow the user to make the operational input,
the controller determines the cooperation scheme to be used for transmission of each of the image-with-the UI signal and the image-without-the UI signal, based on the current cooperation scheme that is currently functioning, and
the in-vehicle apparatus further includes:
an input device that receives the operational input by the user;
wherein the input to the in-vehicle apparatus is conveyed by using the cooperation scheme that is used for the received image-with-the UI signal, when the input is received by the input device while the output device of the in-vehicle apparatus is reproducing the image with the UI signal.

6. The cooperation system according to claim 1, wherein the priority information includes a combination of a cooperation scheme and a physical coupling and a degree of priority of the combination in use for transmission of each of the audio signal and the image signal.

7. A cooperation method between a mobile terminal and an in-vehicle apparatus that can be coupled according to a plurality of cooperation schemes by using one or more physical couplings, the cooperation method comprising:
by the mobile terminal,
setting an audio signal and an image signal as output data;
determining the cooperation scheme to be used for transmission of the output data, based on the cooperation scheme that is operatively functioning;
transmitting the output data to the in-vehicle apparatus by using the determined cooperation scheme;
by the in-vehicle apparatus,
receiving the output data from the mobile terminal according to the cooperation scheme;
reproducing the received output data; and
storing summarized information for which the cooperation scheme to be used for transmission of each of the audio signal and the image signal included in the output data is stated, and priority information in which a degree of priority in use for transmission of each of the audio signal and the image signal included in the output data is set on each of the cooperation schemes, in a memory in the mobile device, wherein the summarized information includes a combination of a cooperation scheme and a physical coupling to be used for transmission, and wherein the summarized information and the priority information are different from each other;
determining the cooperation scheme that is operatively functioning, determining the cooperation scheme to be used for transmission of each of the audio signal and the image signal by referring to the priority information stored in the storage section based on the cooperation scheme determined as operatively functioning, and updating the summarized information stored in the storage section based on the cooperation scheme determined to be used for transmission; and
determining the cooperation scheme to be used for transmission of the output data by referring to the summarized information updated by the summarized information update section.

8. The cooperation method according to claim 7, wherein the mobile terminal and the in-vehicle apparatus are coupled by using a plurality of the physical couplings, and
the mobile terminal determines the physical coupling to be used for transmission of the output data.

9. The cooperation method according to claim 7, wherein
in the priority information, the degree of priority in use for transmission of each of the audio signal and the image signal is set,
in the summarized information, the cooperation scheme to be used for transmission of each of the audio signal and the image signal is stated,
the mobile terminal determines the cooperation scheme to be used for transmission of each of the audio signal and the image signal, and updates the summarized information, and
the mobile terminal determines the cooperation scheme to be used for transmission of the output data, based on determination as to which one of the audio signal and the image signal the output data is, and on the summarized information.

10. The cooperation method according to claim 7, wherein the output data includes a notification that causes a user who uses at least one of an audio and an image to pay attention,
in the summarized information, the cooperation scheme to be used for transmission of the notification is further stated,
in the priority information, a degree of priority in use for transmission of the notification is further set on each of the cooperation schemes, and
the mobile terminal determines the cooperation scheme that is operatively functioning, determines the cooperation scheme to be used for transmission of the notification by referring to the priority information, and updates the summarized information.

11. The cooperation method according to claim 7, wherein the image signal includes an image-with-user interface (UI) signal in which a user interface that allows a user to make an operational input, and an image-without-UI signal that does not allow the user to make the operational input,
the mobile terminal determines the cooperation scheme to be used for transmission of each of the image-with-UI signal and the image-without-UI signal, based on the cooperation scheme that is operatively functioning,
the in-vehicle apparatus further includes an input device that receives the operational input made by the user, and
when the in-vehicle apparatus receives the input at the input device while the image-with-UI signal is being reproduced, the input device conveys the input to the in-vehicle apparatus by using the cooperation scheme that is used for the received image-with-UI signal.

12. The cooperation method according to claim 7, wherein the priority information includes a combination of a cooperation scheme and a physical coupling and a degree of priority of the combination in use for transmission of each of the audio signal and the image signal.

13. A non-transitory computer-readable medium for storing a cooperation program to be executed by a mobile terminal that can be coupled to an in-vehicle apparatus according to a plurality of cooperation schemes by using one or more physical couplings,
wherein the cooperation program causes the mobile terminal to:
set an audio signal and an image signal as output data;
determine the cooperation scheme to be used for transmission of the output data, based on the cooperation scheme that is operatively functioning;
transmit the output data to the in-vehicle apparatus according to the determined cooperation scheme; and
storing summarized information for which the cooperation scheme to be used for transmission of each of the audio signal and the image signal included in the output data is stated, and priority information in which a degree of priority in use for transmission of each of the audio signal and the image signal included in the output data is set on each of the cooperation schemes, in a memory in the mobile device, wherein the summarized information includes a combination of a cooperation scheme and a physical coupling to be used for transmission, and wherein the summarized information and the priority information are different from each other;
determining the cooperation scheme that is operatively functioning, determining the cooperation scheme to be used for transmission of each of the audio signal and the image signal by referring to the priority information stored in the storage section based on the cooperation scheme determined as operatively functioning, and updating the summarized information stored in the storage section based on the cooperation scheme determined to be used for transmission; and determining the cooperation scheme to be used for transmission of the output data by referring to the summarized information updated by the summarized information update section.

14. The non-transitory computer-readable medium according to claim 13, wherein the mobile terminal and the in-vehicle apparatus are coupled by using a plurality of the physical couplings, and the cooperation program further causes the mobile terminal to determine a physical coupling to be used for transmission of the output data.

15. The non-transitory computer-readable medium according to claim 13, wherein the image signal includes an image-with-user interface (UI) signal for displaying a user interface that allows a user to make an operational input, and an image-without-UI signal for displaying an image that does not allow the user to make the operational input, and the cooperation program further causes the mobile terminal to determine the cooperation scheme to be used for transmission of each of the image-with-UI signal and the image-without-UI signal, based on the cooperation scheme that is operatively functioning.

16. The non-transitory computer-readable medium according to claim 13, wherein the priority information includes a combination of a cooperation scheme and a physical coupling and a degree of priority of the combination in use for transmission of each of the audio signal and the image signal.

17. A cooperation system comprising a mobile terminal and an in-vehicle apparatus coupled according to a plurality of cooperation schemes by using one or more physical couplings, wherein the mobile terminal includes:

a memory for storing an application that outputs an audio signal and an image signal as output data;

a controller that determines a selected cooperation scheme to be used for transmission of the output data, based on a current cooperation scheme that is currently functioning; and a library stored in the memory that transmits the output data to the in-vehicle apparatus by using the selected cooperation scheme determined by the controller, and the in-vehicle apparatus includes:

a transmission protocol controller that receives the output data from the library by using the selected cooperation scheme; and an output device that reproduces the output data received by the transmission protocol controller, wherein the output data includes a notification that causes a user who uses at least one of an audio and an image to pay attention, in the summarized information, the cooperation scheme to be used for transmission of the notification is further stated, in the priority information, a degree of priority in use for transmission of the notification is further set on each of the cooperation schemes, and the mobile terminal further determines the cooperation scheme that is operatively functioning, determines the cooperation scheme to be used for transmission of the notification by referring to the priority information, and updates the summarized information.

* * * * *